(12) United States Patent
Bichler et al.

(10) Patent No.: US 8,344,084 B2
(45) Date of Patent: *Jan. 1, 2013

(54) LIQUID ADMIXTURE COMPOSITION

(75) Inventors: Manfred Bichler, Engelsberg (DE);
 Herbert Hommer, Mühldorf (DE);
 Frank Dierschke, Oppenheim (DE);
 Anja Trieflinger, Burgkirchen (DE);
 Konrad Wutz, Trostberg (DE)

(73) Assignee: BASF Construction Polymers GmbH, Trostberg (DE)

( * ) Notice: Subject to any disclaimer, the term of this patent is extended or adjusted under 35 U.S.C. 154(b) by 104 days.

This patent is subject to a terminal disclaimer.

(21) Appl. No.: 12/887,924

(22) Filed: Sep. 22, 2010

(65) Prior Publication Data

US 2011/0015327 A1 Jan. 20, 2011

Related U.S. Application Data

(63) Continuation of application No. 11/894,029, filed on Aug. 17, 2007, now abandoned, which is a continuation-in-part of application No. 11/827,722, filed on Jul. 13, 2007, now Pat. No. 7,855,260, which is a continuation-in-part of application No. 11/451,625, filed on Jun. 12, 2006, now abandoned, which is a continuation-in-part of application No. 11/152,678, filed on Jun. 14, 2005, now abandoned.

(51) Int. Cl.
 *C08F 28/02* (2006.01)
 *C08F 22/10* (2006.01)
 *C08K 5/09* (2006.01)
 *C08K 5/10* (2006.01)

(52) U.S. Cl. .............. 526/287; 526/317.1; 526/318.5; 524/306; 524/386

(58) Field of Classification Search ............ 526/318.5, 526/317.1, 286, 287; 524/306, 386
 See application file for complete search history.

(56) References Cited

U.S. PATENT DOCUMENTS

| | | |
|---|---|---|
| 4,025,359 A | 5/1977 | Connelly, Jr. |
| 4,222,886 A | 9/1980 | Connelly, Jr. |
| 4,572,722 A | 2/1986 | Dyer |
| 4,820,344 A | 4/1989 | Geke et al. |
| 4,894,169 A | 1/1990 | Delitsky |
| 4,921,571 A | 5/1990 | Kukanskis et al. |
| 5,308,401 A | 5/1994 | Geke et al. |
| 5,672,279 A | 9/1997 | Sargent et al. |
| 5,798,425 A | 8/1998 | Albrecht |
| 6,139,623 A | 10/2000 | Darwin et al. |
| 6,149,793 A | 11/2000 | Melody et al. |
| 6,235,181 B1 | 5/2001 | Kinard et al. |
| 6,340,660 B1 | 1/2002 | Gastgaber |
| 6,777,517 B1 * | 8/2004 | Albrecht et al. ............ 526/317.1 |
| 6,919,388 B2 | 7/2005 | Nishikawa et al. |
| 7,150,322 B2 | 12/2006 | Szymanski et al. |
| 7,393,886 B2 | 7/2008 | Bandoh et al. |
| 2002/0107310 A1 * | 8/2002 | Shendy et al. ................ 524/2 |
| 2002/0111399 A1 * | 8/2002 | Bury et al. ..................... 524/2 |
| 2003/0087993 A1 | 5/2003 | Nishikawa et al. |
| 2003/0106464 A1 * | 6/2003 | Yamashita et al. ............ 106/728 |
| 2005/0257720 A1 | 11/2005 | Shendy et al. |
| 2006/0281885 A1 | 12/2006 | Bichler et al. |
| 2006/0281886 A1 | 12/2006 | Bichler et al. |
| 2007/0039516 A1 | 2/2007 | Bandoh |
| 2008/0139701 A1 | 6/2008 | Danzinger et al. |

FOREIGN PATENT DOCUMENTS

| | | |
|---|---|---|
| DE | 195 43 304 A1 | 5/1997 |
| EP | 0 537 870 | 4/1993 |
| EP | 0 736 553 | 10/1996 |
| EP | 1 189 955 | 3/2002 |
| EP | 1 308 427 | 5/2003 |
| EP | 1308427 A1 * | 5/2003 |
| EP | 1 669 332 | 6/2006 |
| EP | 1669332 A1 * | 6/2006 |
| EP | 1 829 839 | 9/2007 |
| WO | WO 98/31643 | 7/1998 |
| WO | WO 9831643 A1 * | 7/1998 |
| WO | WO 2006/021792 A2 | 3/2006 |

\* cited by examiner

*Primary Examiner* — Michael M Bernshteyn

(74) *Attorney, Agent, or Firm* — Fulbright & Jaworski LLP

(57) ABSTRACT

An admixture comprises an aqueous composition of a) a copolymeric dispersing component, b) an antifoaming agent component, c) a surfactant component, and d) water. The components may be a blend or physically or chemically attached and result in a stable liquid system that can be used as a dispersing agent for a calcium sulfate compound containing construction chemicals composition.

32 Claims, No Drawings

US 8,344,084 B2

LIQUID ADMIXTURE COMPOSITION

This application is a continuation of U.S. Ser. No. 11/894,029 filed Aug. 17, 2007, abandoned, which is a continuation-in-part of U.S. Ser. No. 11/827,722 filed July 13, 2007, now U.S. Pat. No. 7,855,210, which is a continuation-in-part of U.S. Ser. No. 11/451,625 filed Jun. 12, 2006, abandoned, which is a continuation-in-part of U.S. Ser. No. 11/152,678 filed Jun. 14, 2005, abandoned, each of which is incorporated herein by reference in its entirety.

FIELD OF THE INVENTION

This invention relates to a liquid admixture composition for a calcium sulfate based binder system and a method of use.

BACKGROUND OF THE INVENTION

Various types of organic compounds have been used to advantageously alter certain properties of wet hydraulic binder compositions. One class of components, which can collectively be called "superplasticizers" fluidify or plasticize wet cement composition to obtain a more fluid composition. A controlled fluidity is desired, such that the aggregate used in mortars and concretes does not segregate from the cement paste. Alternatively, superplasticizers may allow the cement composition to be prepared using a lower water to cement ratio in order to obtain a composition having a desired consistency which often leads to a hardened cement composition having a higher compressive strength development after setting.

A good superplasticizer should not only fluidify the wet hydraulic binder composition to which it is added, but also maintain the level of fluidity over a desired period of time. This time should be long enough to keep the wet composition fluid, e.g. in a ready-mix truck while it is on its way to a job site. Another important aspect relates to the period for discharging the truck at the job site and the period needed for the cement composition for being worked in the desired final form. On the other side, the cement mixture cannot remain fluid for a too long time, that means the set must not greatly be retarded, because this will slow down the work on the job and show negative influences on the characteristics of the final hardened products.

Conventional examples of superplasticizers are melamine sulfonate/formaldehyde condensation products, naphthalene sulfonate/formaldehyde condensation products and lignosulfonates, polysaccharides, hydroxycarboxylic acids and their salts and carbohydrates.

In most cases, fluidizing agents are multi-component products with copolymers based on polyalkylene glycol monovinyl ethers and unsaturated dicarboxylic acid-derivatives as most important species. The European Patent EP 0 736 553 B1 discloses such copolymers comprising at least three subunits and especially one unsaturated dicarboxylic acid derivative, polyalkylene glycol monovinyl ethers and additionally one hydrophobic structural unit, such as ester units. The third structural unit can also be represented by polypropylenoxid- and polypropylenoxid-polyethylenoxid-derivatives, respectively.

The German published application DE 195 43 304 A1 discloses an additive for water containing mixtures for the construction field comprising a) a water-soluble sulfonic acid-, carboxylic- or sulfate group containing cellulose derivative, b) a sulfonic acid- and/or carboxylic acid containing vinyl-(co)-polymer and/or a condensation product based on aminoplast-builders or acryl containing compounds and formaldehyde. This additive shall show sufficient water retention ability and rheology-modifying properties. Therefore, this additive shall be suitable for construction chemical compositions containing cement, plaster of paris, lime, anhydrite and other hydraulic binder components.

Copolymers based on unsaturated monocarboxylic or dicarboxylic acid derivatives, oxyalkylenglycolalkenylethers, vinylic polyalkylenglykol, polysiloxane or ester compounds used as additives for aqueous suspensions based on mineral or bituminous binders are described in U.S. Pat. No. 6,777,517 B1. The use of such additives results in a decrease in the water/binder ratio and leads to highly fluid building materials without segregation of individual constituents from the building material mixture. The copolymers according to this U.S. patent are useful as additives for aqueous suspensions of inorganic and organic solids and especially for suspensions that are based on mineral or bituminous binders such as cement, plaster of paris, lime, anhydrite or other building materials based on calcium sulfate.

Disclosed also are copolymers of unsaturated ethers that can be used as plasticizers for cement containing mixtures (EP 0 537 870 A1). These copolymers contain an ether co-monomer and as additional co-monomer an olefinic unsaturated mono-carboxylic acid or an ester or a salt thereof, or alternatively an olefinic unsaturated sulfonic acid. These copolymers show a very short ether side chain with 1 to 50 units. The short side chain causes a sufficient plasticizing effect of the copolymers in cement containing masses with a reduced slump loss of the construction chemicals mass itself.

U.S. Pat. No. 6,139,623 discloses an emulsion admixture for use in hydraulic cement compositions formed by emulsifying an antifoaming agent, a surfactant and a copolymer having a carbon-containing backbone to which are attached groups that function as cement-anchoring members by forming ionic bonds and oxyalkylene groups. This admixture comprising an ethylene oxide/propylene oxide (EO/PO) type comb polymer and an antifoaming agent allows a predictable air control in hydraulic cement compositions such as concrete. The term "cement composition" refers to pastes, mortars, grouts such as oil well cementing grouts, and concrete compositions comprising a hydraulic cement binder. Typical antifoaming agents are phosphate ester, borate ester and polyoxyalkylene copolymers with defoaming properties. The surface active component (surfactant) is said to stabilize the emulsion mixture and is chosen from the group consisting of an esterified fatty acid ester of a carbohydrate, a $C_2$ to $C_{20}$ alcohol having polyoxyalkylene groups or a mixture thereof.

An admixture composition for cementitious compositions is published in US 2005/0257720 A1. This admixture comprises a water insoluble defoamer, an amine salt solubilizing agent capable of solubilizing the water insoluble defoamer in an acidic medium, and optionally a dispersant for cementitious compositions. This combination of an amine salt solubilizing agent, a water insoluble defoamer and a dispersant provides a stable admixture for cementitious compositions by showing a long-term storage stability. Polycarboxylates are typical dispersant components. Mineral oils, vegetable oils, fatty acid ester, ether compounds, hydroxyl functional compounds, an alcohol, a phosphoric ester, a silicon, a polyoxyalkylene, a hydrocarbon, an acetylenic compound and a polymer comprising at least one of propylene oxide or ethylene oxide moieties are typical water insoluble defoamer. Hydraulic cements are portland cement, masonry cement, alumina cement, refractory cement, magnesia cement, calciumsulfoaluminate cement and oil well cements.

WO 2006/021792 A2 discloses a method of cementing in a subterranean formation whereby a cement composition is provided that comprises water, hydraulic cement and a defoamer. Components of the defoamer include at least one compound selected from the group of a defoaming hydrocarbon base fluid, a surfactant, a hydrophobic particle or a mixture therefore. The hydraulic cement can be a gypsum cement and the cement composition can further contain a dispersant.

As indicated above this application is based on the prior patent published as US 2006/0281886, which discloses a co-polymer comprising two monomer components with a component a) being an olefinic unsaturated monocarboxylic acid co-monomer or an ester or a salt thereof or an olefinic unsaturated sulfuric acid co-monomer or a salt thereof, and with component b) preferably represented by an ether compound. This two monomeric co-polymer can be preferably used as a superplasticizer in a hydraulic binder containing composition. There it is alternatively disclosed that the co-polymer can be used in combination with a defoaming component that is also an additional structural unit of the co-polymer. Consequently, the defoaming component can be chemically attached to the co-polymer or being present in free form in a blend. Under general aspects the prior art teaches the use of dispersing agents (plasticizers) such as polycarboxylate ethers (PCE) as typical additive for calcium sulfate containing binder systems. This results in a water reduction as well as in an enhancement of physical properties such as compressive strength due to an increase in gypsum cast density. Additionally, the workability and preferably the rheological behavior of the construction chemicals composition are improved. On the other hand the addition of PCE based dispersants causes a distinct air entrainment to the binder component that worsens the physical properties of the composition. For overcoming these drawbacks defoamer components are used as additional additive to the dispersing agent. However, defoamers show a low solubility in aqueous formulations and cause an insufficient stability. Moreover, the defoaming properties of the formulation decrease over time due to the resulting phase separation of the defoamer and the dispersant.

Based on the different characteristics and the availability of the superplasticizers mentioned above, it has been further desired to come up with new admixtures which are an improvement over the current state of the art. It is thus an object of this invention to provide new additives for calcium sulfate binder containing compositions which impart to wet binder compositions excellent fluidizing and water reduction properties. An additional aspect is an aqueous and calcium sulfate based suspension with sufficient workability.

DETAILED DESCRIPTION OF THE INVENTION

The present invention relates to a liquid admixture composition for a calcium sulfate binder system containing composition comprising an aqueous composition comprising a) a copolymeric dispersing component, b) an antifoaming agent component, c) a surfactant component, and d) water.

The term "calcium sulfate compound" according to this invention means calcium sulfate in its anhydrous and hydrate forms, such as gypsum, anhydrite, calcium sulfate dihydrate and calcium sulfate hemi-hydrate.

The term "gypsum" according to this invention is also known as calcium sulfate, whereby calcium sulfate can be used in its various anhydrous and hydrate forms with or without crystal water. Natural gypsum is represented by calcium sulfate dihydrate and the natural crystal water free form of calcium sulfate is represented by the term "anhydrite". Besides the natural forms, calcium sulfate is a typical by-product of technical processes characterized by the term "synthetic gypsum". One example of such technical processes is the flue gas desulphurization. Synthetic gypsum may also be a by-product of phosphorous acid and hydrogen fluoride production methods for gaining hemi-hydrate forms $(CaSO_4 \cdot \frac{1}{2} H_2O)$. Calcium sulfate dihydrate $(CaSO_4 \cdot 2H_2O)$ may be calcined by driving off the water of hydration. Products of the various calcined procedures are alpha or beta hemi-hydrate. Beta calcium sulfate hemi-hydrate particles show a highly porous structure formed by the rapid release of water during the heating in open units. Alpha hemi-hydrate is produced by a de-watering of gypsum in closed autoclaves. In this case the crystal form of alpha hemi-hydrate has lower surface area and is denser, and therefore lower water demand than beta hemi-hydrate.

On the other hand, gypsum hemi-hydrate re-hydrates with water to calcium dihydrate crystals. Usually, the hydration of calcium sulfate hemi-hydrate is completed in a period of minutes to hours indicating a clearly shortened workability period in contrast to cements that hydrate in periods over hours or days. These characteristics make gypsum an attractive alternative to cement as hydraulic binder in various fields of application, because hardened final gypsum products show a characteristic hardness and compressive strength.

Calcium sulfate hemi-hydrate can produce at least two crystal forms, whereby α-calcined gypsum is usually de-watered (de-hydrated) in closed auto-claves. For various fields of application, β-calcined gypsum may be selected due to its availability under economical aspects. However, these advantages may be reversed because β-calcined gypsum needs higher water amounts for workability and for making slurries of a given fluidity. Hardened or dried gypsum made from calcium sulfate hemihydrate mixed at higher water-stucco-ratio tends to be less dense. Therefore, products thereof show less strength than gypsum products that have been made with smaller amounts of water.

In general, the workability of gypsum, but also of other hydraulic binders, can be improved under hydraulic aspects by adding dispersants. In this connection, the admixture composition according to this invention represents a suitable dispersant because of the dispersing properties of its aqueous composition component.

In a specific alternative the claimed admixture contains component a) in an amount of 10 to 60.0% by weight, the antifoaming agent b) 0.01 to 10.0% by weight, the surfactant component c) 0.01 to 10.0% by weight, and the rest is d) water. The given amounts are based on the total aqueous composition. In a more preferred admixture the component a) is in an amount of 20.0 to 50.0% by weight, the antifoaming agent b) 0.01 to 5.0% by weight, the surfactant component c) 0.01 to 5.0% by weight, and the rest as d) water.

Based on the main aspect of the invention that the aqueous composition comprising the components a), b), c) and d) is an essential component of the liquid admixture composition for a calcium sulphate based binder system. An important aspect are the amounts of the single components a) to d) and therefore one preferred aspect of the invention is an admixture wherein the amounts of the antifoaming agent b) and the surfactant component c) are independently from 0.05 to 10.0% by weight, related to the dispersing component a).

The component a) should be a copolymer having $a_1$) a carbon containing backbone to which are attached groups that function as calcium sulfate compound-anchoring members by forming ionic bonds with calcium ions of the calcium sulfate compound, and $a_2$) oxyalkylene groups.

Preferably the copolymer of component a) includes two monomer components wherein component $a_1$) is:

an olefinic unsaturated mono-carboxylic acid co-monomer or an ester or salt thereof or an olefinic unsaturated sulfonic acid compound as further co-monomer or a salt thereof, and component $a_2$) is:

a co-monomer according to the general formula (I)

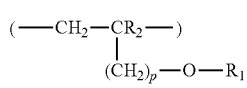

wherein $R_1$ is represented by

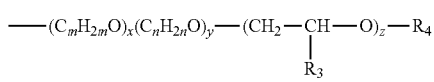

and whereby $R_2$=H or an aliphatic hydrocarbon group having from 1 to 5 carbon atoms, $R_3$ is a non-substituted or substituted aryl group and preferably phenyl, and $R_4$=H or an aliphatic hydrocarbon group having from 1 to 20 carbon atoms, a cycloaliphatic hydrocarbon group having from 5 to 8 carbon atoms, a substituted aryl group having from 6 to 14 carbon atoms or a compound selected from the group

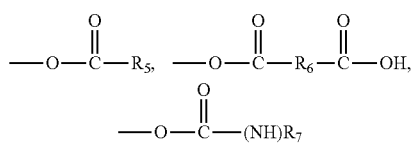

wherein $R_5$ and $R_7$ may each be an alkyl, aryl, aralkyl or alkaryl group and $R_6$ may be an alkyliden, aryliden, aralkyliden or alkaryliden group and p=0, 1, 2 or 3, m and n=independently 2, 3, 4 or 5, x and y are independently and integer from 1 to 350, and z=0 to 200.

In general, these polymers according to the invention and based on their dispersing properties show excellent plasticizing effects over time and additionally can be prepared by using usual preparation methods. Therefore, under economic aspects, these co-polymers as a component of liquid admixture compositions and together with other functional components such as the co-claimed antifoaming agent and the surfactant show significant improvements over the prior art. Another aspect is that the aqueous composition as a component of the admixture exhibits its plasticizing effect mainly in the field of gypsum as defined herein. Additionally, the improved effect of the copolymer together with the antifoaming agent and the surfactant can be selectively chosen based on the broad variety of the ether co-monomer and especially based on the broad scope of the side chain length.

The copolymer according to the invention as component a) exhibits especially more advantageous properties when it includes the co-monomer component $a_1$) in amounts of from 30 to 99 mol-% and the ether component $a_2$) from 70 to 1 mol-%.

As used herein, the mentioned co-monomers $a_1$) and $a_2$), respectively, are to be interpreted as structural units of the claimed copolymer after its polymerization.

In a preferred embodiment the mol-% of the co-monomer component $a_1$) and the co-monomer $a_2$) is from 40 to 95 and from 60 to 5, respectively, and the ether component $a_2$) with p=0 or 1 is represented by a vinyl or an allyl group and additionally contains a polyether as $R_1$; additionally, the co-monomer component $a_1$) is in this alternative an acrylic acid or a salt thereof.

In general, according to the present invention, the co-monomer component $a_1$) is selected from the group consisting of acrylic acid, methacrylic acid, crotonic acid, iso-crotonic acid, maleic acid, fumaric acid, citraconic acid, itaconic acid, (meth)allyl sulfonic acid, vinyl sulfonic acid, and their suitable salts or their alkyl or hydroxyalkyl esters, or mixtures thereof.

Alternatively, other co-monomers, such as styrene or acrylamides may be additionally be co-polymerized with the ether component $a_2$) and comonomer component $a_1$). Alternatively, components with hydrophobic properties may be used. Compounds with ester structural units, polypropylene oxide or polypropylene oxide-polyethylene oxide (PO/PE) or polybutylene oxide-polyoxyethylene (PB/PE) or polystyrene oxide-polyethylene oxide (PS/PE)-units are preferred. These additional structural units should be represented in the copolymer in amounts up to 5 mol-%; amounts from 0.05 to 3 mol-% and 0.1 to 1.0 mol-% are preferred. Compounds as disclosed by U.S. Pat. Nos. 5,798,425 and 6,777,517 as structural units c) and any related and in these both documents disclosed species of compounds are more preferred. Regarding the structure of the additional co-monomer U.S. Pat. Nos. 5,798,425 and 6,777,517 are incorporated into this application by reference and therefore are to be seen as disclosed herein.

An additional preferred alternative of the copolymers according to this invention is to be seen in formula (I) representing a vinyl or an allyl group containing polyether.

As already mentioned, the copolymers of this invention can be produced by relatively simple methods and especially when the polymerisation is carried out in an oxygen-depleted or oxygen-free atmosphere. There also may be added some amounts of solvents to make the ether component soluble. In the case that co-monomer $a_2$) is a poly-alcoholic group or an alkylen oxide derivatived poly-alcohol group, and $R_2$ of the ether component is hydrogen, respectively, water is the solvent to be preferred. Alternatively, a mixture of water and alcohol, such as isopropanol, may be added. In the case that $R_2$ is other than hydrogen, then organic solvents and especially toluene is to be seen as preferred.

For starting the polymerisation reaction, the basic mixture is heated to ambient temperature or smoothly cooled down. Another suitable alternative may be the addition of a redox system as initiator component. This redox system may comprise reducing and oxidizing agents and preferably Rongalite™ or Bruggolite™ and additionally a peroxide or a persulfate like $H_2O_2$ or ammonia persulfate. These reagents may be preferably used in systems with water as solvent. Rongalite, also called Rongalit (registered trademark of BASF) is sodium hydroxymethylsulfinate. The salt is water-soluble and generally sold as the dihydrate. This salt is prepared from sodium dithionite, it is used both as a reducing agent and as a reagent to introduce $SO_2$ groups into organic molecules. Bruggolite (Brüggolit) of Brüggemann Chemicals is a sodium formaldehyde sulfoxylate (SFS) based reducing agent for the textile, pharmaceutical and bleaching industry.

In principal, two alternatives may be selected to produce the copolymers according to this invention:

Alternative A:

The co-monomer mixture and the reducing agent containing mixture are to be added to the ether containing mixture stepwise or simultaneously; the temperatures range from 0 to 50° C.

Alternative B:

The mixture containing the oxidizing agent is to be added stepwise to the complete monomer mixture.

Then the reaction mixture is usually stirred until all the peroxide has reacted. In the case that organic solvents are to be used, these will be distilled. The reaction product will then be cooled down and the copolymer is to be neutralized by using a base (such as alkaline or alkaline earth metals, amines or alkanol amines). The addition of an aqueous solution comprising sodium or calcium hydroxide is a preferred alternative.

This disclosed process represents an example for producing the copolymer according to this invention.

Finally, this invention covers a preferred alternative with the copolymers in powdery form. The powder is to be achieved by a final drying step and more preferably, by spray drying.

In contrast to the state of the art this method produces beneficial powdery copolymers to be added to hydraulic and calcium sulfate containing mixtures in any selected dilution.

Besides the copolymeric dispersing component a) the aqueous composition according to the claimed liquid admixture additionally comprises an anti-foaming agent as component b). This antifoaming agent is preferably selected from the group consisting of a mineral oil, a vegetable oil, a silicon oil, a silicon containing emulsion, a fatty acid, a fatty acid ester, an organic modified polysiloxane, a borate ester, an alkoxylate, a polyoxialkylene copolymer, acetylenic diols having defoaming properties and a phosphoric ester having the formula $P(O)(O—R_8)_{3-x}(O—R_9)_x$, wherein P represents phosphorus, O represents oxygen and $R_8$ and $R_9$ are independently a $C_2$-$C_{20}$ alkyl or an aryl group and x=0, 1, 2, whereby an alkyl group with $C_2$-$C_8$ is preferred.

Preferably said antifoaming agent comprises tri-alkylphosphate and more preferably triiso-butylphosphate, a polyoxypropylen-copolymer and a glycerol alcoholate.

The invention additionally comprises an admixture wherein said anti-foaming agent comprises a mixtures of a tri-alkylphosphate and a polyoxypropylene copolymer.

The third component c) of the aqueous composition, namely the surfactant, is preferably selected from the group consisting of a ethylene oxide/propylene oxide (EO/PO) block copolymer, a styrene/maleic acid copolymer, a fatty alcohol alkoxylate, an alcohol ethoxylate $R_{10}$-(EO)—H with $R_{10}$ being an aliphatic hydrocarbon group having from 1 to 25 carbon atoms, acetylenic diols, monoalkylpolyalkylenes, ethoxylated nonylphenols, alkylsulfates, alkylethersulfats, alkylethersulfonates, alkylethercarboxylates.

More preferably surfactant component c) comprises an alcohol having a polyalkylene group consisting of a carbon chain length of 2 to 20 carbon atoms, with a specific carbon chain length of $C_3$-$C_{12}$.

Advantageously the admixture according to the invention comprises an aqueous composition that contains the anti-foaming agent component b) in free form or attached to the dispersing component a), or a mixture thereof. If the antifoaming agent is attached to the dispersing component it can be physically or chemically attached, and if it is chemically attached in this case a polymerized and/or grafted form is preferred. When chemically attached, the antifoaming agent also can be considered as a third co-monomer of the copolymeric dispersing component. In its free form the antifoaming agent is a blend component of the aqueous composition. Thus, antifoaming agent component b) is either physically and/or chemically attached to the dispersing component a) and/or it is a free form component and therefore part of a blend.

In addition to the admixture per se the invention also relates to the admixture prepared by the process of forming an aqueous composition of containing components a), b) and c) preferably as a physical blend (mixture), by combining the dispersing component a) with the surfactant component c) as a stabilizing agent in water and adding the antifoaming agent b) to the aqueous solution consisting of the stabilized combination of components a) and c).

According to a second alternative components a), b) and c) are formed into an aqueous composition, preferably as a physical blend (mixture), by combining the antifoaming agent b) with the surfactant component c) as a stabilizing agent in water and adding the dispersant component a) to the aqueous solution consisting of combination of components b) and c). Alternatively, the aqueous solution of the combination of components b) and c) can be added to the dispersant component a). The invention generally relates to any sequence of combining the main components a), b) and c) under suitable reaction parameters such as temperature and pressure. Preferred are temperatures between 15 and 60° C. and more preferred are ambient temperatures and ambient pressure.

Thus, the liquid admixture composition of the invention is a stable liquid system being mainly a dispersion with a mixture of suspension systems and/or emulsion systems. The final system of the admixture depends from the chemical nature of components a), b) and c) and their amounts in the aqueous composition. Independent from the final systems or the comprised sub-systems the liquid admixture relates to the aqueous composition in a stable form. It is an important aspect of the given invention that the liquid admixture represents a stabilized solution with hydrophobic properties that shows its advantages in a calcium sulfate component containing system.

In embodiments where the defoaming agent is provided as an additional chemical structural group of the copolymer the already mentioned structural units "c)" of the European patents U.S. Pat. Nos. 5,789,425 and 6,777,517 may be used.

In addition to the admixture per se this invention also relates to a hydraulic binder containing composition that additionally to a calcium sulfate compound as the hydraulic component comprises a copolymer containing aqueous composition.

The invention also relates to a method of use of the claimed admixture as dispersing agent (superplasticizer) for a non-hardened (wet) and a calcium sulfate binder containing composition. In this connection the copolymer is preferably used in amounts from 0.01 to 10.0% by weight and more preferably in amounts from 0.05 to 5.0% by weight, each amount relating to the weight of the binder component.

Surprisingly, homogenous dispersing agent containing admixtures with a high storage stability can be achieved by the addition of surfactants such as Lutensol®TO6 or a styrene/maleic acid copolymer. Such admixtures of the invention containing an aqueous composition of a dispersant, a defoamer and a surfactant show an improved stability over time, distinct dispersing properties in a binder and preferably calcium sulfate containing compositions and a low air entrainment during preparation. The admixtures of the invention comprise PCE as disclosed in US 20060281886 with acrylic acid and an alkoxylated vinylether as monomers, a water insoluble defoamer (such as Pluriol®P2000 or Degressal type defoamers of BASF AG) and an emulsifying surfactant. The preparation of such admixtures of the invention can vary: The defoamer and the surfactant can subsequently added to the aqueous dispersant solution or, alternatively, a mixture containing the defoamer and the surfactant can be dispersed into an aqueous PCE solution. In calcium sulfate containing binder systems such as anhydrite based grouts the admixtures of the invention cause a significant reduction in air entrainment and also a considerable improvement in flow compared to PCE containing formulations without a defoamer component.

The admixture composition of the invention and especially its application as dispersing agent in a calcium sulfate compound containing composition represents a clear improvement of the state of the art because the admixture with its contained aqueous composition induces a uniform plasticizing effect over time and an improvement of the physical properties due to reduction of both water and air content in the wet construction chemicals gypsum mass. Furthermore, the claimed admixture shows an improved storage stability and homogeneity. Additionally, the pumpability and workability of the wet hydraulic binder containing composition is significantly improved.

The following examples underline the advantages of the claimed admixture, its contained aqueous composition, the comprised components and its use.

EXAMPLES

1. Admixture Preparation

Example 1.1

To a 1 liter four necked glass flask with a temperature controller, a reflux condenser and two dropping funnels 490.0 g water, 350.0 g (0.06 mol) polyethylene glycol-5800-monovinylether and 10.0 g NaOH (20%) were added. An mixture comprising 26.0 g (0.36 mol) of acrylic acid in 40.0 g water was produced separately and then was added to the polyethylene glycol-monovinylether-solution; the pH decreased to 5.3. Then 40.0 mg iron(II)sulfate-heptahydrate ("green vitriol") and 4.0 g Rongalite™ and 1.5 g mercaptoethanol was added. After a short period of stirring 3.6 g 50% hydrogen peroxide was added. The temperature increased from 20 to 29° C. Then the solution was stirred for 10 minutes at ambient temperature and was subsequently neutralized with 37.0 g of a 20% sodium hydroxide solution. The copolymeric dispersant was a light yellow colored, clear and aqueous polymer solution with a solid concentration of 40% by weight. To the copolymeric dispersant the antifoaming agent and the surfactant were added: This emulsion was made by adding consecutively the antifoaming agent and the surfactant to the stirred solution (500 rpm) of the copolymeric dispersant at ambient temperature (25° C.). The amounts of the materials shown in Table 1 are in percent by weight of the solution.

Example 1.2

To the flask according to Example 1 490 g water, 350.0 g (0.06 mol) polyethylene glycol-5800-monovinylether, 35.0 g (0.006 mol) of a mixed ethylene-propylene polyalkylene glycol-6000-monovinylether, having a 10% propylene content, and 10.0 g NaOH (20%) were added. A mixture comprising 26.0 g (0.36 mol) of acrylic acid in 40.0 g water was produced separately and then been added to the polyethylene glycol-monovinylether-solution; the pH decreased to 5.3. Then 40.0 mg iron(II)sulfate-heptahydrate ("green vitriol") and 4.0 g Rongalite™ and 1.5 g mercaptoethanol were added. After a short period of stirring 3.6 g 50% hydrogen peroxide were added. The temperature increased from 20 to 29° C. The solution was than stirred for 10 minutes at ambient temperature and was subsequently neutralized with 37.0 g of a 20% sodium hydroxide solution. The copolymeric dispersant was a light yellow colored, clear and aqueous polymer solution with a solid concentration of 40% by weight. To the copolymeric dispersant a mixture of the antifoaming agent and the surfactant has been added: This emulsion was formed by adding the antifoaming agent to the surfactant under stirring at 500 rpm and subsequently mixing this blend to the copolymeric dispersant at ambient temperature (25° C.). The amounts of the materials shown in Table 1 are in percent by weight of the solution.

2. Application Test in a Gypsum System

In the following admixtures (Test Solution) antifoaming agent A1 has been a polypropyleneglycol commercially available as Pluriol® P2000 and antifoaming agent A2 an alkoxylated alcohol commercially available as Degressal® SD23, both from BASF Aktiengesellschaft. Surfactant S1 was a isotridecanolethoxylate commercially available as Lutensol® TO6 from BASF Aktiengesellschaft. Surfactant S2 is a styrene/maleic acid copolymer which was synthesized according to EP 0306449 A2.

TABLE 1

| Solution | Dispersant according to example | Antifoaming agent (%) A1 | Antifoaming agent (%) A2 | Surfactant (%) S1 | Surfactant (%) S2 | Stability, 3 month at 25° C. |
|---|---|---|---|---|---|---|
| E1 | 1.1 | 0.6 | | 0.4 | | + |
| E2 | 1.1 | 0.4 | | 0.6 | | + |
| E3 | 1.1 | | 0.6 | 0.4 | | + |
| E4 | 1.1 | | 0.4 | 0.6 | | + |
| E5 | 1.1 | 0.4 | | | 0.6 | + |
| E6 | 1.1 | | 0.4 | | 0.6 | + |
| E7 | 1.2 | 0.4 | | 0.6 | | + |
| E8 | 1.2 | 0.4 | | | 0.6 | + |
| E9 | 1.2 | | 0.4 | | 0.8 | + |
| E10 | 1.2 | | 0.4 | | 0.6 | + |
| C1 | 1.1 | 0.4 | | | | —)* |
| C2 | 1.2 | 0.4 | | | | —)* |
| C3 | 1.1 | | | | | n.a. |

)*phase separation within two days

Guide Recipe

| | |
|---|---|
| FGD anhydrite (flue gas gypsum) | 350 g |
| Sand (0-2 mm) | 536.3 g |
| Quartz filler 1600 | 100 g |
| CEM I 42.5 R | 10.5 g |
| Potassium sulfate | 2.5 g |
| Tylose MH 2000 | 0.3 g |
| Water | 200 g |
| Admixture (Superplasticizer) | 0.02%-bwg (=by weight of gypsum) |

Mixing Procedure and Measurement:

The mixing procedure and the measurements were done in accordance with the European Standard EN 196-1 and DIN 18555-2.

TABLE 2

| | Flow (cm) | | | | | |
|---|---|---|---|---|---|---|
| Admixture | 0 | 15 | 30 | 45 | 60 min | Air content (%) |
| E2 | 21.9 | 21.7 | 21.7 | 21.3 | 21.1 | 1.5 |
| E6 | 22.4 | 22.3 | 22.1 | 22.0 | 22.0 | 1.5 |
| E8 | 21.7 | 21.6 | 20.7 | 20.6 | 20.4 | 1.4 |
| C3 | 20.3 | 20.5 | 20.3 | 20.0 | 20.0 | 6.0 |

As illustrated in Table 2, the admixtures according to the invention show defoaming properties. The air contents were found to be significantly lower than in the comparison example C3.

It is claimed:

1. An aqueous composition comprising:
   a copolymeric dispersing agent having a copolymer;
   an antifoaming agent;
   a surfactant; and
   water,
   wherein the copolymer of the copolymeric dispersing agent consists of two monomer components wherein component $a_1$) is an olefinic unsaturated monocarhoxylic acid comonomer or an ester or a salt thereof or an olefinic unsaturated sulfuric acid compound or a salt thereof, and component $a_2$) is a comonomer of the formula (I)

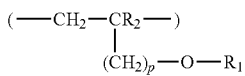

wherein $R_1$ is

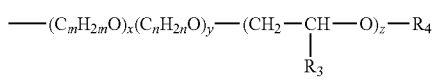

and wherein in $R_2$ is H or an aliphatic hydrocarbon group having from 1 to 5 carbon atoms, $R_3$ is a non-substituted or substituted aryl group, and
$R_4$ is H or an aliphatic hydrocarbon group having from 1 to 20 carbon atoms, a cycloaliphatic hydrocarbon group having from 5 to 8 carbon atoms, a substituted aryl group having from 6 to 14 carbon atoms or a compound selected from the group

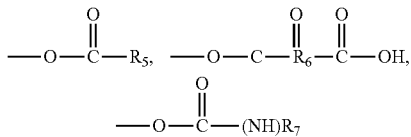

wherein $R_5$ and $R_7$ are independently an alkyl, aryl, aralkyl or alkaryl group and $R_6$ is an alkylidene, arylidene, aralkylidene or alkaryiidene group and p is 0, 1, 2 or 3, m and n are independently 2, 3, 4 or 5, x and y are independently an integer from 1 to 350, and z is 0 to 200.

2. The aqueous composition according to claim 1, wherein the copolymeric dispersing agent is 10.0 to 60.0% by weight based on the total weight of aqueous composition; the amount of the antifoaming agent is 0.01 to 10.0% by weight based on the total weight of aqueous composition, the amount of the surfactant is 0.01 to 10.0% by weight based on the total weight of aqueous composition, and the remainder is water.

3. The aqueous composition according to claim 1, wherein the amount of the copolymeric dispersing agent is 20.0 to 50.0% by weight, the amount of the antifoaming agent is 0.01 to 5.0% by weight, the amount of the surfactant is 0.01 to 5.0% by weight, and the rest is water, whereby any of the given amounts are based on the total weight of the aqueous composition.

4. The aqueous composition according to claim 1, wherein the antifoaming agent and the surfactant are independently present in an amount of from 0.05 to 10.0% by weight related to the copolymer dispersing agent.

5. The aqueous composition according to claim 1, wherein the copolymer of the copolymeric dispersing agent has $a_1$) a carbon-containing backbone to which are attached groups that function as calcium-sulfate compound-anchoring members by forming ionic bonds with calcium ions of the calcium sulfate compound, and $a_2$) oxyalkylene groups.

6. The aqueous composition according to claim 1, wherein $R_2$ is an aliphatic hydrocarbon group having from 1 to 5 carbon atoms.

7. The aqueous composition according to claim 6, wherein $R_3$ is phenyl.

8. The aqueous composition according to claim 5, wherein comonomer $a_1$) comprises a member selected from the group consisting of acrylic acid, methacrylic acid, crotonic acid, isocrotonic acid, maleic acid, fumaric acid, citraconic acid, itaconic acid, (meth)allylsulfonic acid and vinylsulfonic acid, or a salts, alkyl esters or hydroxyalkyl esters thereof, or a mixture thereof.

9. The aqueous composition according to claim 5, wherein copolymeric dispersing agent comprises from 30 to 99 mol % of the comonomer component $a_1$) and from 70 to 1 mol of the ether component $a_2$).

10. The aqueous composition according to claim 5, wherein the amount of the comonomer component $a_1$) is from 40 to 95 mol % and the amount of the comonomer component $a_2$) is from 60 to 5 mol %.

11. The aquegus composition according to claim 5, wherein the comonomer component $a_1$) is an acrylic acid or a salt thereof and the ether component $a_2$) with p is 0 or 1 represents a vinyl or allyl group and additionally contains a polyether.

12. The aqueous composition according to claim 6, wherein the dispersing agent a) comprises additional structural groups in copolymerized form.

13. The aqueous composition according to claim 12, wherein the additional structural group is at least one of a styrene, acrylamide, or a hydrophobic compound.

14. The aqueous composition according to claim 13, wherein the additional structural group is at least one member selected from the group consisting of an ester structural unit, a polypropylene oxide unit, a polypropylene oxide/polyethylene oxide unit, a polybuthylene oxide-polyoxyethylene unit and a polystyrene oxide-polyethylene oxide unit.

15. The aqueous composition according to claim 12, wherein the additional structural group is contained in amounts up to 5 mol %.

16. The aqueous composition according to claim 12, wherein the additional structural group is contained in amounts from 0.05 to 3.0 mol %.

17. The aqueous composition according to claim 12, wherein the additional structural group is contained in amounts from 0.1 to 1.0 mol %.

18. The aqueous composition according to claim 6, wherein formula (I) represents a vinyl or allyl group containing polyether.

19. The aqueous composition according to claim 1, wherein the dispersing agent a) is provided as a powder.

20. The aqueous composition according to claim 19, wherein the powder has been produced by spray drying.

21. The aqueous composition according to claim 1, wherein the antifoaming agent is selected from the group consisting of a mineral oil, a vegetable oil, a silicon oil, a silicon containing emulsion, a fatty acid and a fatty acid ester, an organic modified polysiloxane, a borate ester, an alkoxylate, a polyoxialkylene copolymer, an acetylenic diol haying defoaming properties and a phosphoric ester having the formula $P(O)(O-R_8)_{3-x}(O-R_9)_x$ wherein P represents phosphorus, O represents oxygen and $R_8$ and $R_9$ are independently a $C_2$-$C_{20}$ alkyl or an aryl group and x=0, 1, 2.

22. The aqueous composition according to claim 21, wherein said antifoaming agent b) comprises at least one of tri-alkylphosphate, a polyoxypropylene copolymer or a glycerol alcoholate.

23. The cape composition according to claim 22, wherein the antifoaming agent is triiso-butylphosphate.

24. The aqueous composition according to claim 22, wherein said antifoaming agent comprises a mixture of a tri-alkylphosphate and a polyoxypropylene copolymer.

25. The aqueous composition according to claim 1, wherein said surfactant is selected from the group consisting of a ethylene oxide/propylene oxide (EO/PO) block copolymer, a styrene/maleic acid copolymer, a fatty alcohol alkoxylate, an alcohol ethoxylate $R_{10}$-(EO)—H wherein $R_{10}$ is an aliphatic hydrocarbon group having from 1 to 25 carbon atoms, an acetylenic diol, a monoalkylpoiyalkylene, an ethoxylated nonylphenol, an alkylsulfate, an alkylethersulfate, an alkylethersulfonate or an alkylethercarboxylate 26. The aqueous composition according to claim 1, wherein said surfactant comprises an alcohol haying a polyalkylene group having a carbon chain length of from 2 to 20 carbon atoms.

27. The aqueous composition according to claim 26, wherein said polyalkylene group has a carbon chain length of 3 to 12 carbon atoms.

28. The aqueous composition according to claim 1, wherein the antifoaming agent is in the aqueous composition in at least one of free form or is attached to the coplymeric dispersing agent.

29. The aqueous composition according to claim 1, formed by a process comprising the steps of combining the dispersing agent with the surfactant as a stabilizing agent in dilution water and adding the antifoaming agent to the aqueous solution containing of the stabilized combination of the coplymeric dispersing agent and the surfactant.

30. The aqueous composition according claim 1, formed by a process comprising the steps of combining the antifoaming agent with the surfactant as a stabilizing agent in dilution water and adding the copolymeric dispersing agent to the aqueous solution containing of the combination of the antifoaming agent and the surfactant or alternatively, adding the aqueous solution containing the combination of the antifoaming agent and the surfactant to the copolymeric dispersing agent.

31. The aqueous composition according to claim 1, formed by a process comprising the steps of adding the surfactant to an aqueous solution containing the copolymeric dispersing agent and the antifoaming agent.

32. The aqueous composition according to claim 29, which is a physical blend.

* * * * *